United States Patent
Takishima et al.

[11] Patent Number: 5,841,476
[45] Date of Patent: Nov. 24, 1998

[54] CODING APPARATUS FOR ENCODING MOTION PICTURE

[75] Inventors: Yasuhiro Takishima; Shigeyuki Sakazawa, both of Tokyo; Masahiro Wada, Kanagawa, all of Japan

[73] Assignee: Kokusai Denshin Denwa Co. Ltd., Tokyo, Japan

[21] Appl. No.: 608,511

[22] Filed: Feb. 28, 1996

[30] Foreign Application Priority Data

Mar. 3, 1995 [JP] Japan ................................ 7-068865

[51] Int. Cl.⁶ .................................................. H04N 7/36
[52] U.S. Cl. .......................... 348/416; 348/419; 348/699
[58] Field of Search ............................. 348/390–391, 348/405–406, 416, 419, 699; H04N 7/36

[56] References Cited

U.S. PATENT DOCUMENTS

| | | | |
|---|---|---|---|
| 4,868,641 | 9/1989 | Modaresse | 348/391 |
| 5,038,209 | 8/1991 | Hang | 348/419 |
| 5,231,484 | 7/1993 | Gonzales et al. | 348/405 |
| 5,317,397 | 5/1994 | Odaka et al. | 348/416 |
| 5,337,049 | 8/1994 | Shimoda | 341/50 |
| 5,396,567 | 3/1995 | Jass | 382/251 |
| 5,426,463 | 6/1995 | Reininger et al. | 348/405 |
| 5,459,517 | 10/1995 | Kunitake et al. | 348/416 |
| 5,473,379 | 12/1995 | Horne | 348/416 |
| 5,502,494 | 3/1996 | Auld | 348/426 |

OTHER PUBLICATIONS

"International Organisation for Standardisation Organisation Internationale de Normalisation—ISO–IEC/JTC1/SC29/WG11—Coded Representation of Picture and Audio Information", *Telecommunication Standardization Sector*, Study Group 15, Experts Group for ATM Video Coding, Document AVC–491b, Version 2, Apr. 1993, 1—119.

*Primary Examiner*—Howard Britton
*Attorney, Agent, or Firm*—Nikaido Marmelstein Murray & Oram, LLP

[57] ABSTRACT

A motion picture coding apparatus for searching a plurality of proposed coding modes and/or parameters, for selecting a suitable coding mode and/or a suitable parameter, and for encoding motion pictures using the selected coding mode and/or parameter. The apparatus includes a measuring part for measuring coding status during coding processes to provide at least one measured coding status, and a limiting part for adaptively limiting search range of the proposed coding modes and/or parameters in accordance with the at least one measured coding status.

16 Claims, 13 Drawing Sheets

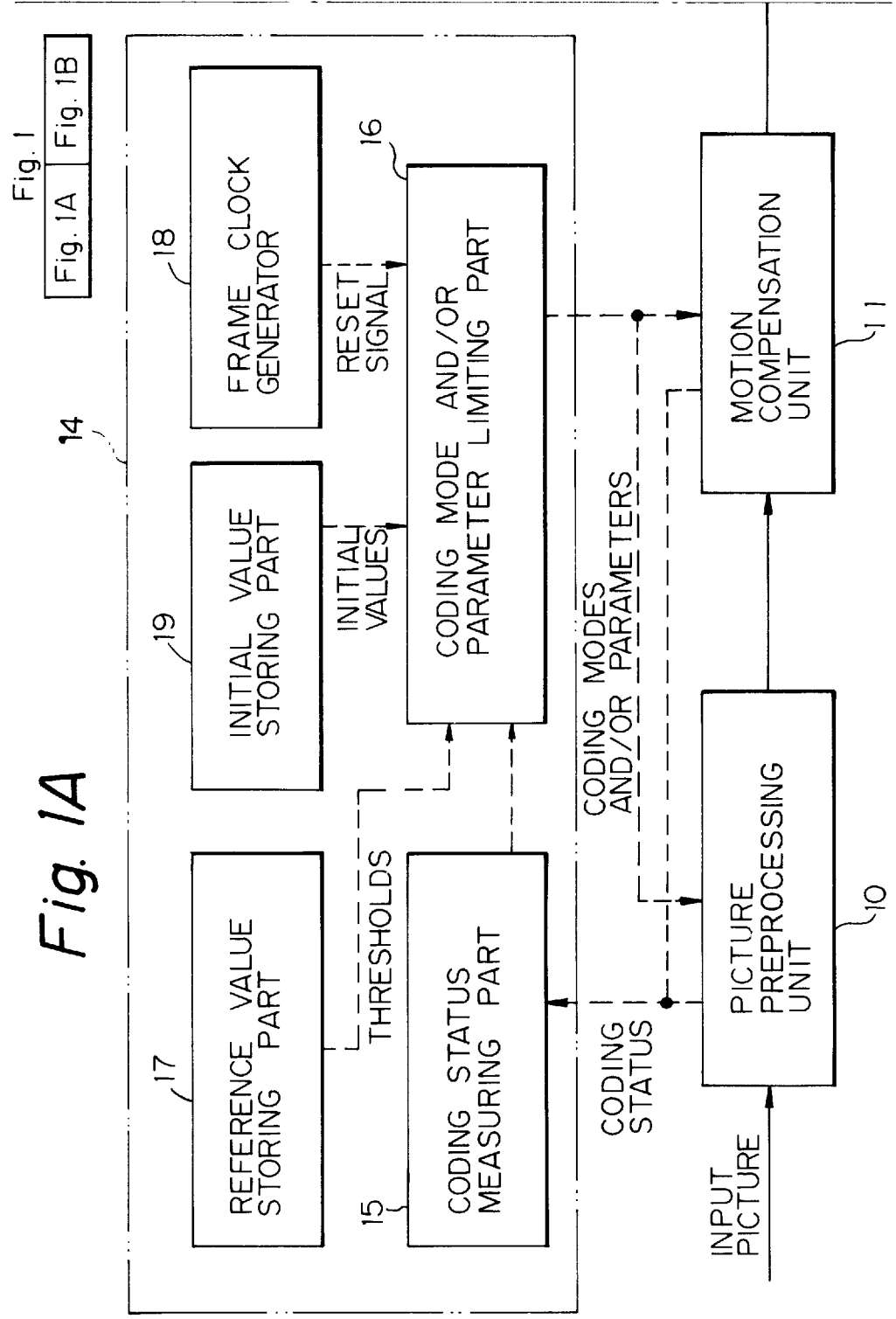

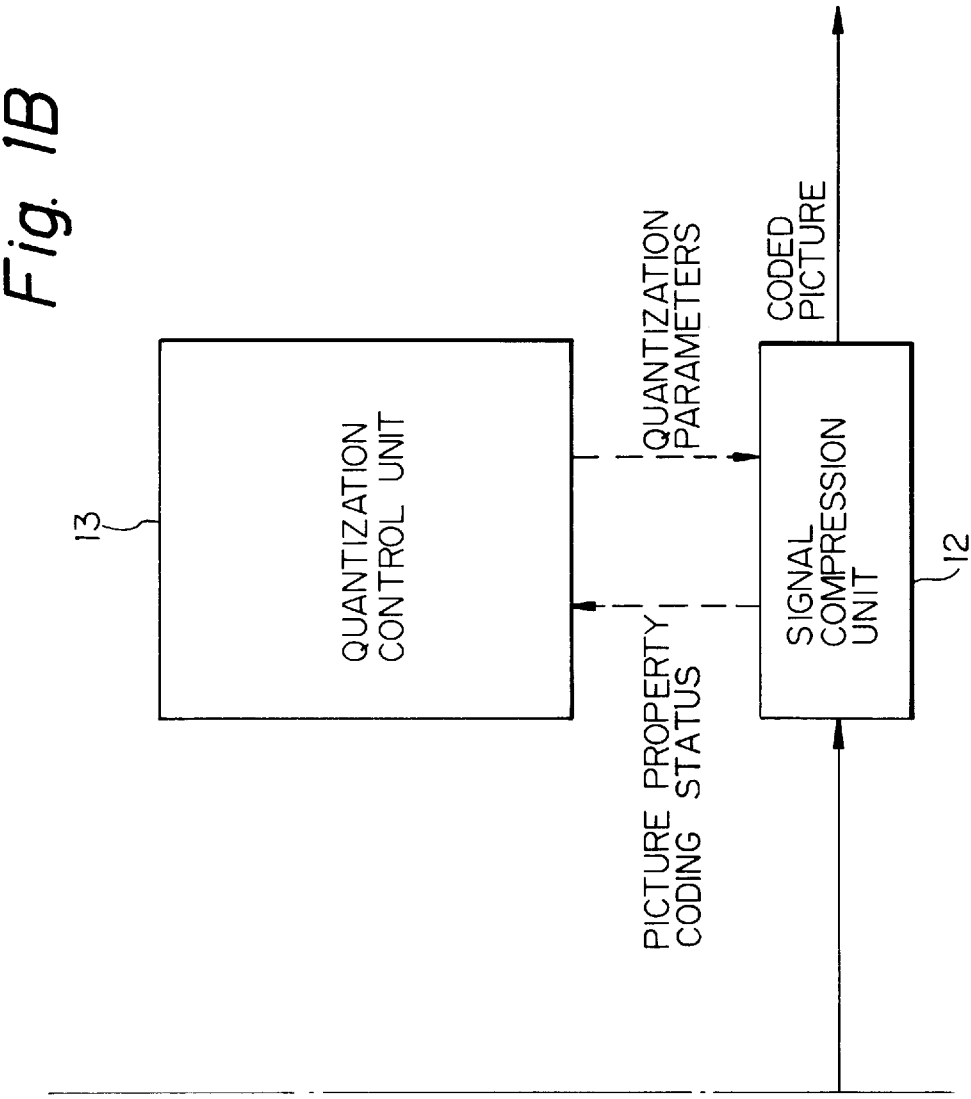

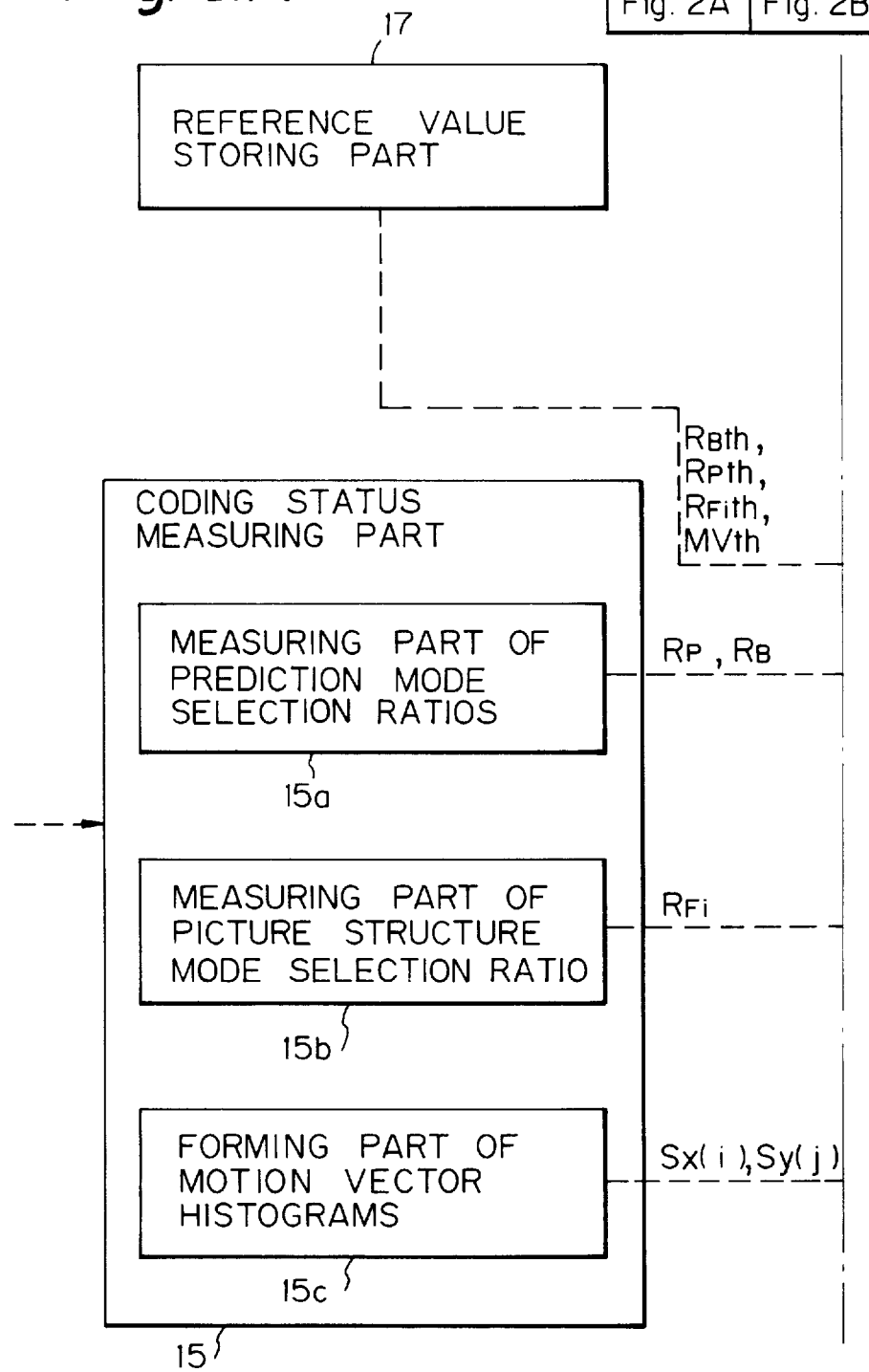

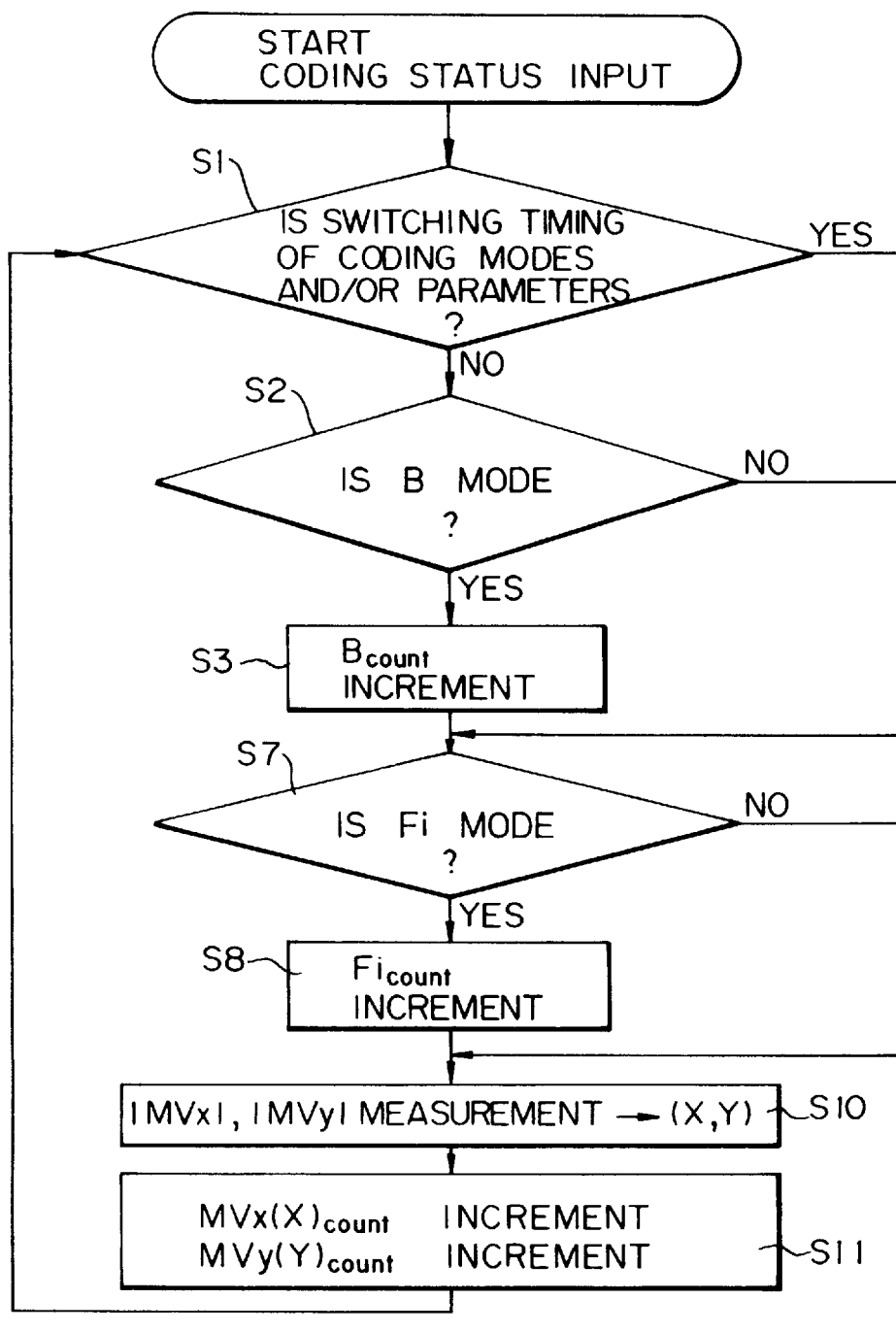

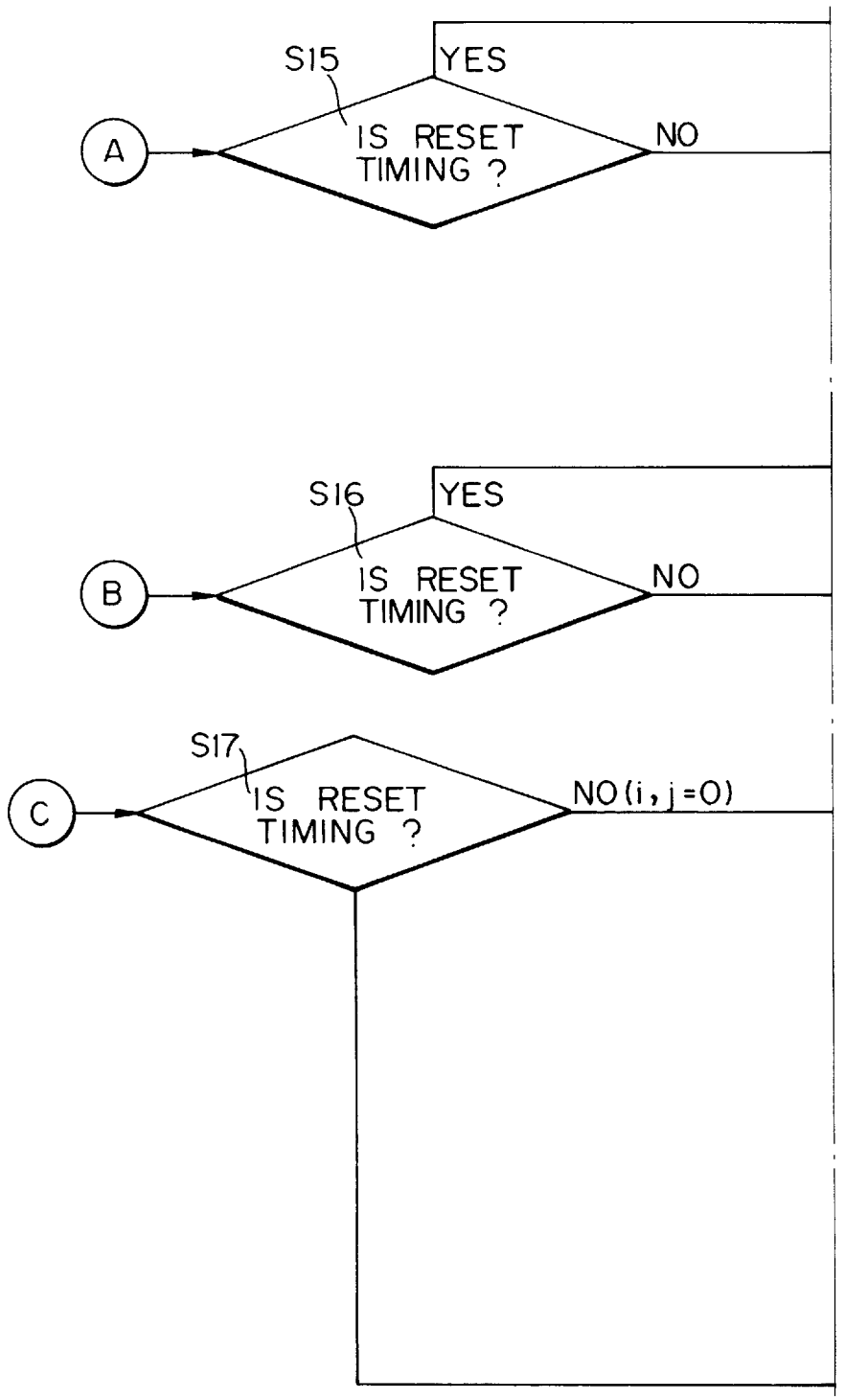

CODING APPARATUS FOR ENCODING MOTION PICTURE

FIELD OF THE INVENTION

The present invention relates to a motion picture coding apparatus, used for example in a digital television transmission system, a picture storage/transmission system or a picture data base system, so as to reduce the amount of the picture information to be transmitted or stored.

DESCRIPTION OF THE RELATED ART

There are many digital picture systems and their applications for encoding motion picture to reduce the information amount and for transmitting or storing the coded picture information. However, in these conventional systems, complicated processes or an extremely large number of calculations have to be carried out in order to improve coded picture quality. For example, it is necessary to perform a process for widely measuring input picture property and a process for fully searching many proposed modes and parameters so as to select a coding mode and/or a parameter which are suitable for the measured picture property.

However, such fully searching process will impose heavy loads on the digital picture. Particularly, in software coding at recently developing platforms such as work stations or personal computers, this fully searching process causes the processing time to extremely increase. Thus, effective processing cannot be expected. Even in hardware coding, this fundamental processing of full search will cause the total processing time including another processing time for improving coded picture quality to finally increase.

SUMMARY OF THE INVENTION

It is therefore an object of the present invention to provide a motion picture coding apparatus, whereby fast coding processing can be attained with maintaining coded picture quality.

According to the present invention, a motion picture coding apparatus for searching a plurality of proposed coding modes and/or parameters, for selecting a suitable coding mode and/or a suitable parameter, and for encoding motion pictures using the selected coding mode and/or parameter is provided. The apparatus includes a measuring means for measuring coding status during coding processes to provide at least one measured coding status, and a limiting means for adaptively limiting search range of the proposed coding modes and/or parameters in accordance with the at least one measured coding status.

In motion picture coding processing, picture property which will vary dynamically is predicted depending upon the coding status to limit coding modes and/or parameters, and then search is performed within the limited coding modes and/or parameters. Thus, fast coding processing can be expected with maintaining coded picture quality.

It is preferred that the measuring means includes means for measuring histograms of magnitudes of motion vectors during coding processes to provide measured histograms, and that the limiting means includes means for limiting search range of motion vectors depending upon the measured histograms.

In one embodiment of the present invention, this means for limiting search range of motion vectors includes means for detecting from the measured histograms a range in which motion vectors of a certain ratio defined by a threshold value is contained so as to determine the search range of motion vectors to the detected range.

Preferably, the apparatus further includes a reset means for periodically resetting the search range of motion vectors to an initial range.

Preferably, the apparatus further includes a reset means for adaptively resetting the search range of motion vectors depending upon the measured histograms. In one embodiment of the present invention, this reset means may include means for increasing the search range of motion vectors when an occurrence rate of a state where magnitudes of the motion vectors become equal to the maximum value of the search range of motion vectors depending upon the measured histograms is more than a threshold value.

It is preferred that the measuring means includes means for measuring a selection ratio of at least one prediction mode during coding processes to provide a measured selection ratio, and that the limiting means includes means for limiting candidates of prediction modes to be searched depending upon the measured selection ratio.

In one embodiment of the present invention, this measuring means may include means for measuring a selection ratio of B mode during coding processes to provide measured selection ratio of B mode, and the limiting means may include means for limiting candidates of prediction modes to be searched to I/P modes when the measured selection ratio of B mode is less than a predetermined threshold value.

In another embodiment of the present invention, this measuring means may include means for measuring selection ratios of B mode and P mode during coding processes to provide measured selection ratios of B mode and of P mode, and the limiting means may include means for limiting candidates of prediction modes to be searched to I/P modes when the measured selection ratio of B mode is less than a first predetermined threshold value and also the measured selection ratio of P mode is equal to or more than a second predetermined threshold value, and for limiting candidates of prediction modes to be searched to I mode when the measured selection ratio of B mode is less than the first predetermined threshold value and also the measured selection ratio of P mode is less than the second predetermined threshold value.

Preferably, the apparatus further includes a reset means for periodically resetting the prediction modes to be searched to initial modes.

Preferably, the apparatus further includes a reset means for adaptively resetting the prediction modes to be searched depending upon histograms of magnitudes of motion vectors, which are measured during coding processes. In one embodiment of the present invention, this reset means may include means for resetting the prediction modes to be searched to initial modes when magnitudes of the motion vectors corresponding to a predetermined inclusion ratio in the measured histograms is less than a threshold value.

It is preferred that the measuring means includes means for measuring a selection ratio of a picture structure mode during coding processes to provide a measured selection ratio, and that the limiting means includes means for limiting structure modes to be searched depending upon the measured selection ratio.

In one embodiment of the present invention, this measuring means may include means for measuring a selection ratio of field mode during coding processes to provide measured selection ratio of field mode, and the limiting means may include means for limiting picture structure mode to be searched to field mode when the measured selection ratio of field mode is more than a predetermined threshold value.

Preferably, the apparatus further includes a reset means for periodically resetting the picture structure mode to frame mode.

Further objects and advantages of the present invention will be apparent from the following description of the preferred embodiments of the invention as illustrated in the accompanying drawings.

BRIEF DESCRIPTION OF THE DRAWINGS

FIG. 1 combined by FIGS. 1A and 1B shows a schematic block diagram of a preferred embodiment of a motion picture coding apparatus according to the present invention;

DESCRIPTION OF THE PREFERRED EMBODIMENTS

Figure 2B:
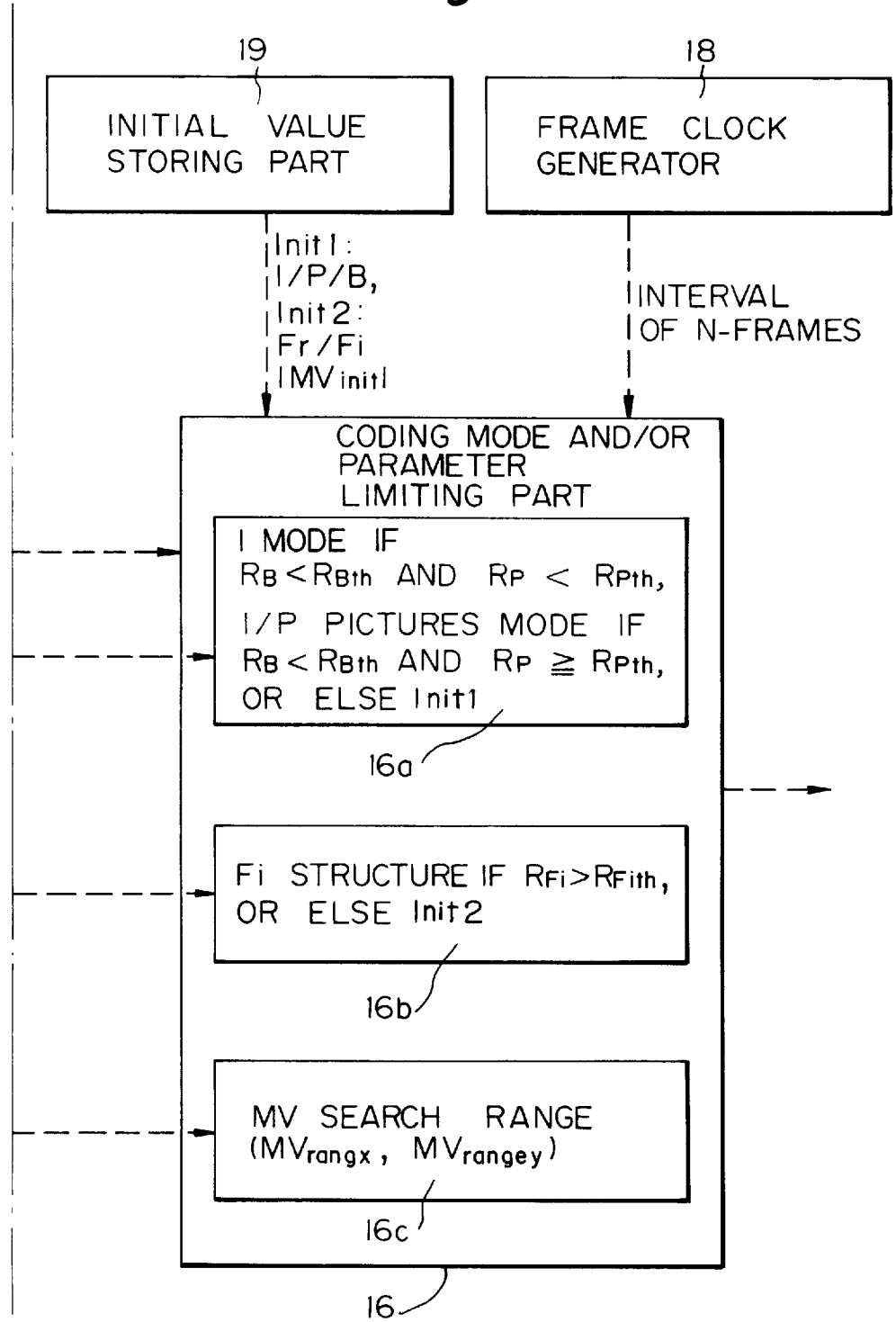
FIG. 2 combined by FIGS. 2A and 2B shows a block diagram of an additional circuit unit in the embodiment shown in FIG. 1.

In FIG. 1, which is combined by FIGS. 1A and 1B and shows a schematic block diagram of a preferred embodiment of a coding apparatus for encoding motion picture according to the present invention, reference numeral 10 denotes a picture preprocessing unit for labeling a decided prediction mode to input picture data and for forming format depending upon its picture structure (frame structure or field structure). The preprocessed picture data are fed to a motion compensation unit 11. The motion compensation unit 11 detects appropriate motion vectors, decides a suitable prediction mode and a picture structure, and then compensates the preprocessed picture data depending upon the detected motion vectors so as to provide compensated picture data to a signal compression unit 12. The signal compression unit 12 performs DCT (Discrete Cosine Transform) processing of the provided picture data at first, then, performs quantization processing of the transformed data, and thereafter performs VLC (Variable Length Coding) processing to output coded picture data. In the quantization processing, quantization parameters decided by a quantization control unit 13 depending upon coded state and picture property are referred.

In FIG. 1, also, solid line arrows represent flows of picture data and broken line arrows represent flows of control signals.

Circuit structures of the aforementioned picture preprocessing unit 10, motion compensation unit 11, signal compression unit 12 and quantization control unit 13 are all well known in this technical field. According to the present invention, however, a specific circuit unit 14 is added to these well known structures. This additional circuit unit 14 receives coding status from the picture preprocessing unit 10 and the motion compensation unit 11, limits coding modes and/or parameters to these with no redundant processing in order to realize fast coding processing, and outputs the limited coding modes and/or parameters to the picture preprocessing unit 10 and the motion compensation unit 11.

Hereinafter, constitution and operation of the additional unit 14 will be described in detail.

The additional circuit unit 14 includes a coding status measuring part 15, a coding mode and/or parameter limiting part 16, a reference value storing part 17, a frame clock generator part 18 and an initial value storing part 19.

The coding status measuring part 15 in the unit 14 measures from coding status in the previous frames or previous fields, necessary values for improving the processing efficiency such as for example selection ratios of the prediction modes.

The coding mode and/or parameter limiting part 16 limits search range of coding modes and/or parameters for attaining fast coding processing with maintaining coded picture quality, based upon the measured values from the measuring part 15 and upon threshold values preliminarily stored in the storing part 17. This limiting part 16 is, according to this embodiment, periodically reset to initial values provided from the storing part 19 in response to a cyclic reset signal from the generator part 18.

FIG. 2 which is combined by FIGS. 2A and 2B is a block diagram concretely illustrating the additional circuit unit 14 in the embodiment in FIG. 1. As will be apparent from the figure, the coding status measuring part 15 consists of a measuring part of prediction mode selection ratios 15a, a measuring part of picture structure mode selection ratio 15b and a forming part of motion vector histograms 15c.

The measuring part of prediction mode selection ratios 15a calculates selection ratios of respective prediction modes I, P and B at every macro block (coding unit) of for example 16×16 picture elements. In this embodiment, a selection ratio $R_B$ of B (Bidirectionally predicted picture) mode and a selection ratio $R_P$ of P (Predicted picture) mode are calculated. It should be noted that $R_B+R_P+R_I=100\%$ wherein $R_I$ is a selection ratio of I (Intra-frame/field coded picture) mode.

The measuring part of picture structure mode selection ratio 15b calculates selection ratios of picture structure modes, namely Fr (Frame) mode and Fi (Field) mode during the motion estimation and compensation. In this embodiment, a selection ratio $R_{Fi}$ of $F_i$ mode is calculated. It should be noted that $R_{Fi}+R_{Fr}=100\%$ wherein $R_{Fr}$ is a selection ratio of Fr mode.

The forming part of motion vector histograms 15c calculates histograms Sx(i) and Sy(J) of absolute values (magnitudes) of the selected motion vectors.

The coding mode and/or parameter limiting part 16 consists of a limiting part of prediction modes 16a, a limiting part of picture structure modes 16b and a limiting part of motion vector search range 16c.

The limiting part of prediction modes 16a limits the prediction modes by comparing the calculated selection ratios $R_B$ and $R_P$ from the measuring part 15a with threshold values $R_{Bth}$ and $R_{Pth}$ from the storing part 17, respectively. Namely, at first, $R_B$ is compared with $R_{Bth}$. If $R_B<R_{Bth}$, B mode is omitted from candidates of prediction modes to be selected and another modes will become the candidates for selection. This is because, in this case, there is not so effective merit of B mode for improving the picture quality. In this embodiment, then $R_P$ is compared with $R_{Pth}$. If $R_P<R_{Pth}$, only I mode is selected as the prediction mode. If $R_P \geq R_{Pth}$, I/P modes (I mode and P mode can be selected are selected as the prediction modes.

In general, B mode in MPEG2 is effective for improving the picture quality, but it requires many times of searches of motion vectors causing its processing time to become very longer than that of I mode or P mode. Thus, in this embodiment, if the selection ratio of this B mode is low due to for example quick motion in the picture, I/P modes are selected instead of I/P/B modes so as to increase the processing speed. Furthermore, if the selection ratio of P mode is low, only I mode is used so as to increase the processing speed moreover.

If $R_B \geq R_{Bth}$, the prediction mode is initialized to I/P/B modes (full selectable mode of I mode, P mode and B mode as Init1.

The limiting part of picture structure modes 16b limits the picture structure modes by comparing the calculated selection ratio $R_{Fi}$ from the measuring part 15b with a threshold value $R_{Fith}$ from the storing part 17. Namely, if $R_{Fi} > R_{Fith}$, Fi structure (Fi mode only) is selected as the picture structure. This is because, in this case, there is not so effective merit of Fr structure (Fi/Fr modes) for improving the picture quality.

As will be understood from the above-description, according to this embodiment, if the selection ratio of the Fi mode is high due to for example quick motion in the picture, Fi structure is selected instead of Fr structure so as to increase the processing speed.

If $R_{Fi} \leq R_{Fith}$, the picture structure mode is initialized to Fr structure (full selectable mode of Fr mode and Fi mode) as Init2.

The limiting part of search range of motion vectors 16c limits search range of motion vector ($MV_{rangex}$, $MV_{rangey}$) by comparing the calculated histograms Sx(i) and Sy(j) from the forming part 15c with a threshold value $MV_{th}$ from the storing part 17 so that motion vectors of a certain ratio which is defined by the threshold value $MV_{th}$ are contained within the motion vector search range ($MV_{rangex}$, $MV_{rangey}$). Thus, in case that motion in the picture is slow, the motion vector search range is limited to smaller so as to increase coding processing speed with maintaining coded picture quality.

The limited coding modes and/or parameters are, in this embodiment, reset to initial values in response to cyclic reset signal from the frame clock generator part 18 at intervals of N frames. Thus, large deterioration of picture quality due to excessive limitation can be prevented.

Figure 3B:
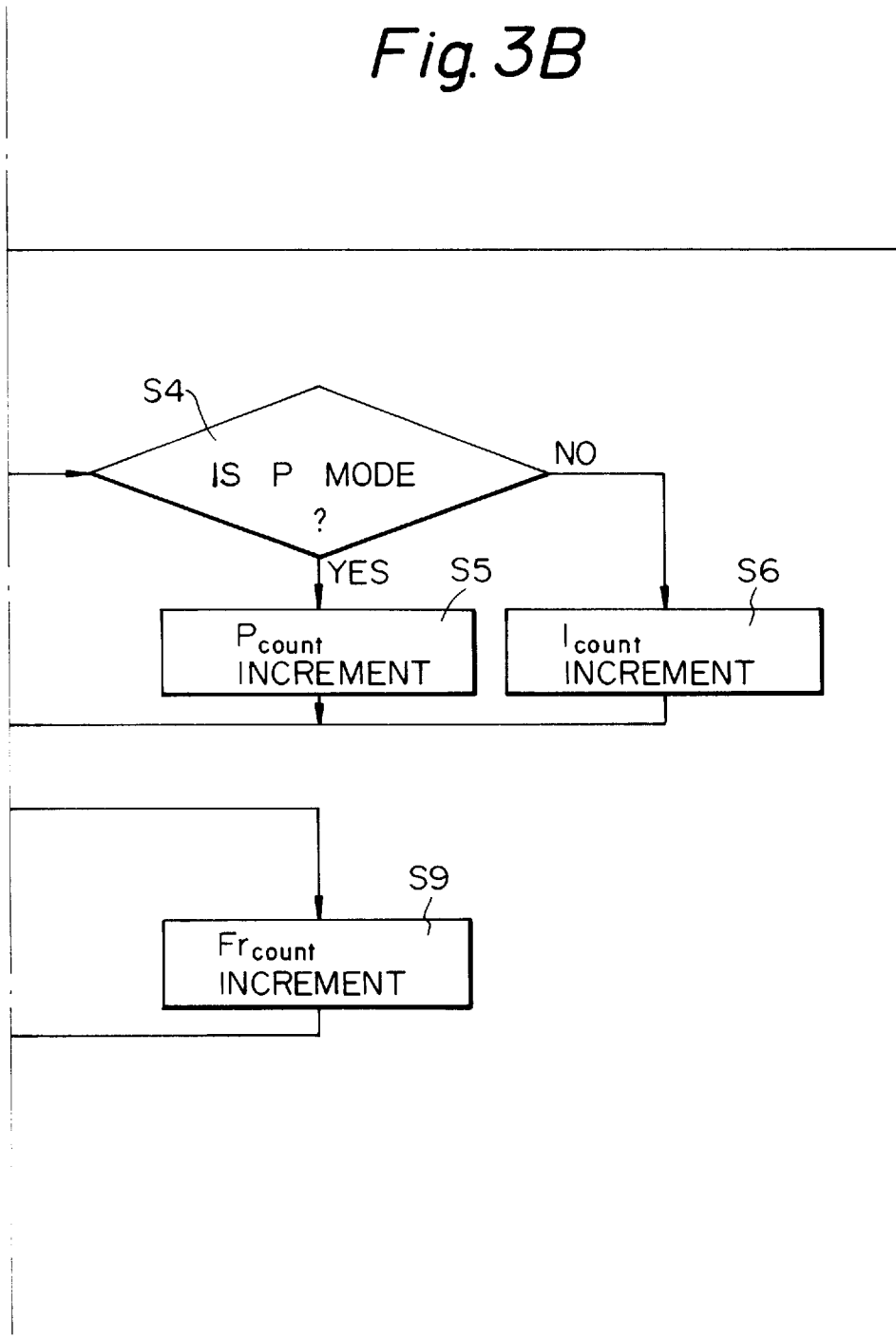
FIG. 3 combined by FIGS. 3A, 3B and 3C shows a part of a flow chart illustrating the operation of the additional circuit unit shown in FIG. 2.
Figure 3C:
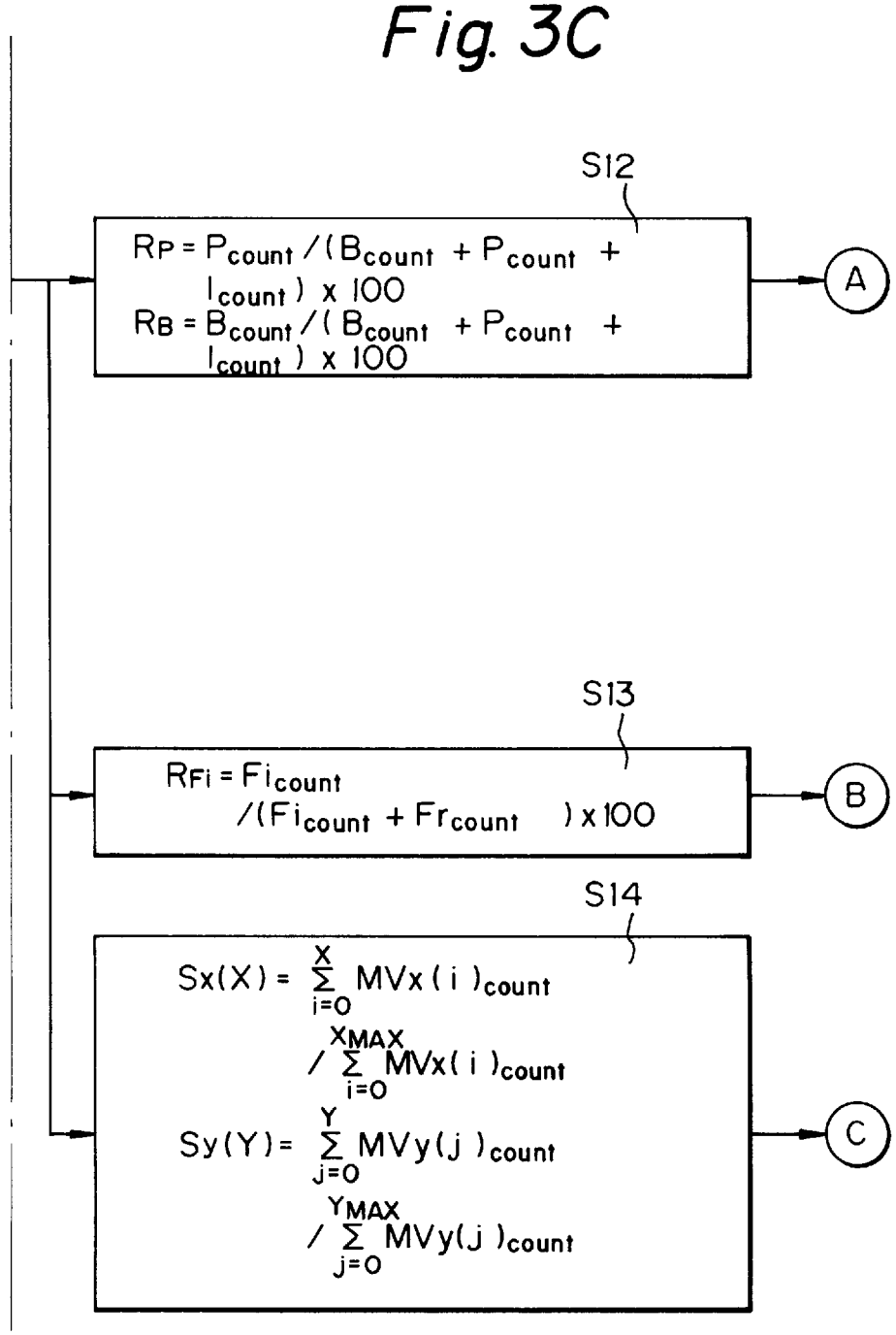
Figure 4B:
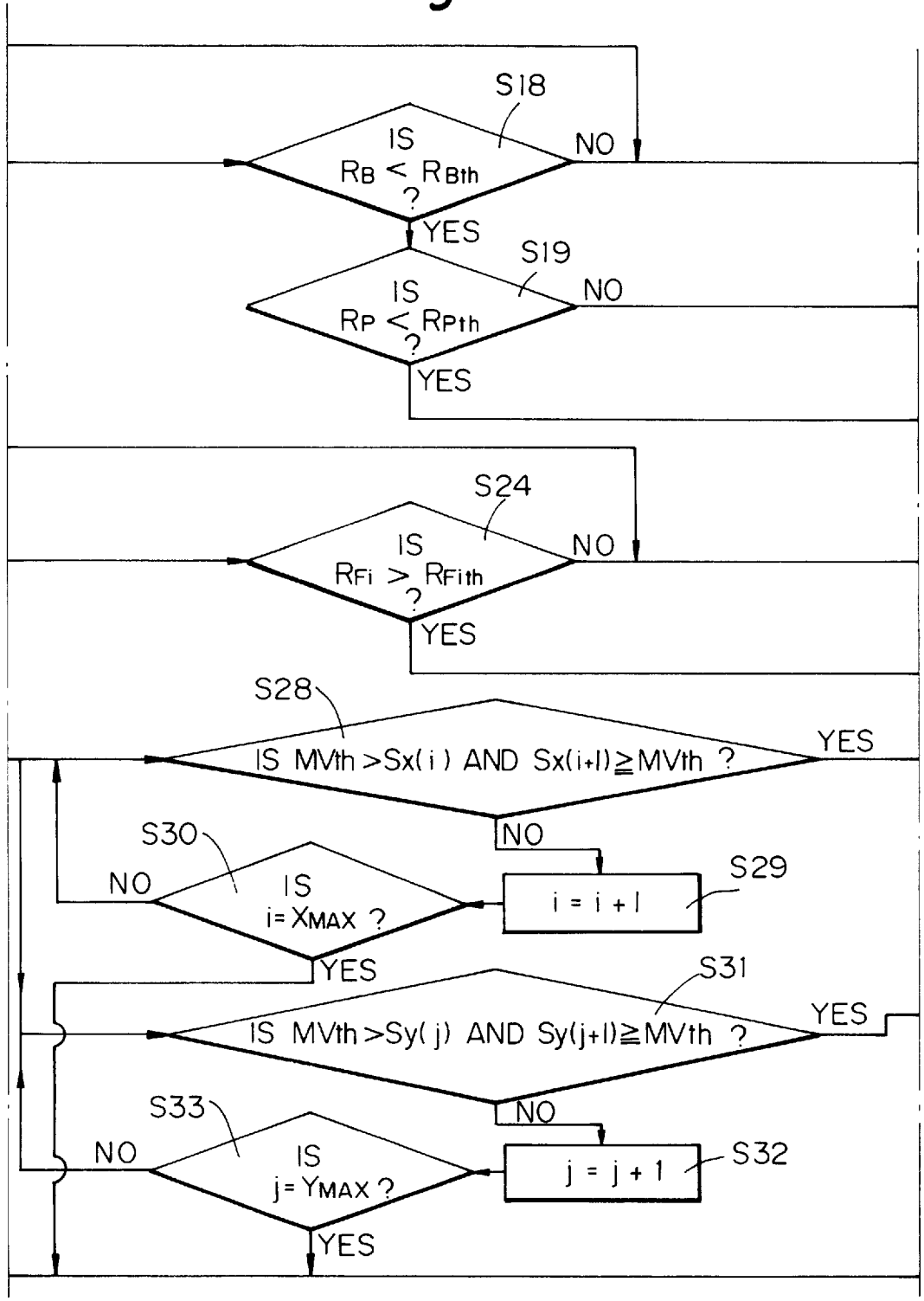
FIG. 4 combined by FIGS. 4A, 4B and 4C shows a part of the flow chart illustrating the operation of the additional circuit unit shown in FIG. 2.
Figure 4C:
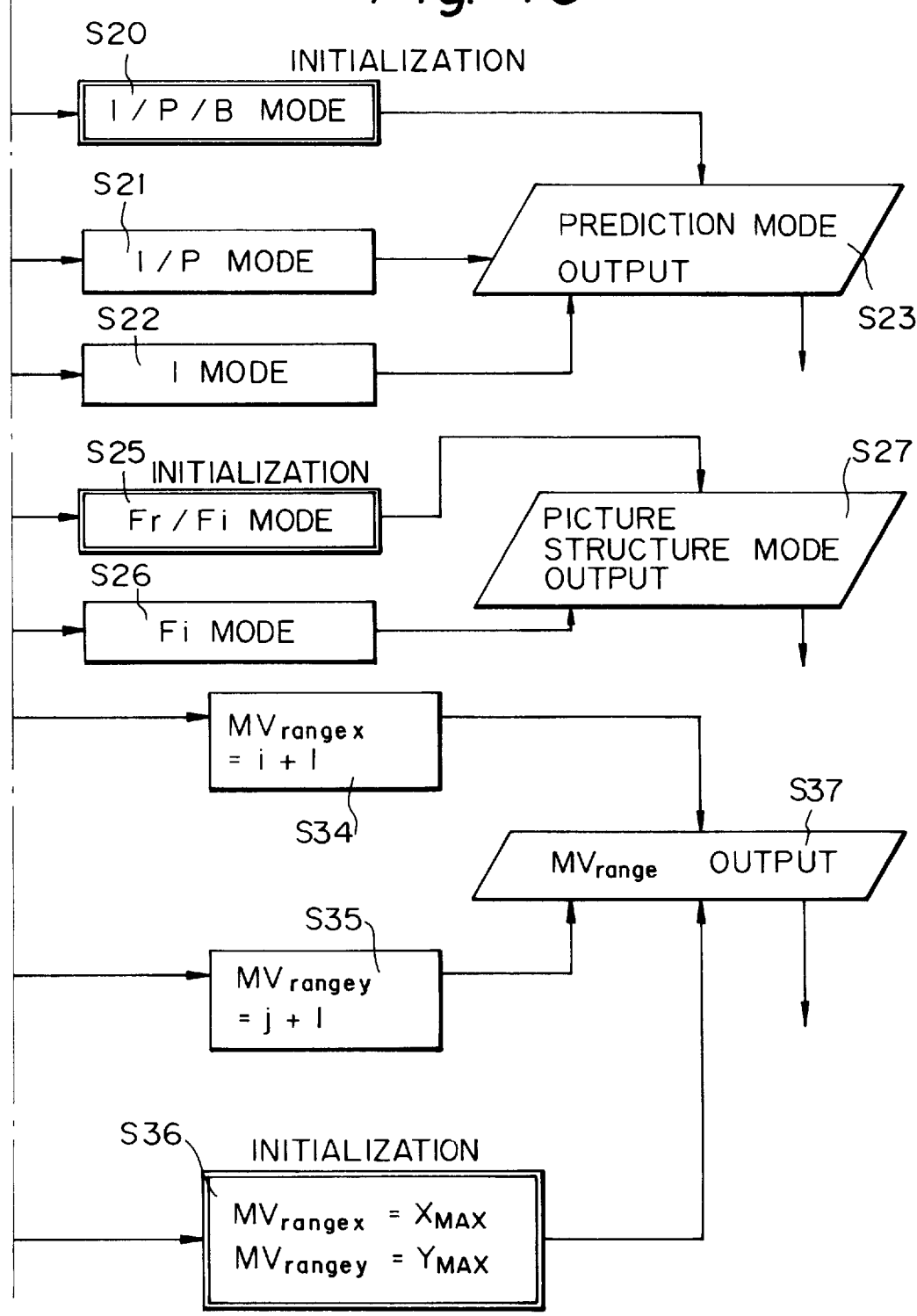

FIGS. 3 and 4 which are combined by FIGS. 3A, 3B and 3C and FIGS. 4A, 4B and 4C, respectively show flow charts illustrating the operation of the above-mentioned additional circuit unit 14.

As illustrated in FIG. 3, when coding status is inputted from the picture preprocessing unit 10 and the motion compensation unit 11, it is judged whether the current frame is a switching timing of the coding modes and/or parameters or not at the step S1. If it is not the switching timing, following steps S2–S11 are performed.

First, at the step S2, it is judged whether the current prediction mode is the B mode or not. If it is the B mode, a counter content $B_{count}$ is incremented by one (step S3). If not, it is judged whether the current prediction mode is the P mode or not at the step S4. If it is the P mode, a counter content $P_{count}$ is incremented by one (step S5). If not, it is judged as the current prediction mode is the I mode and thus a counter content $I_{count}$ is incremented by one (step S6).

Then, at the step S7, it is judged whether the current picture structure mode is Fi mode or not. If it is the Fi mode, a counter content $Fi_{count}$ is incremented by one (step S8). If not, it is judged as the current picture structure mode is the Fr mode and thus a counter content $Fr_{count}$ is incremented by one (step S9).

At the next step S10, absolute values (magnitudes) of the selected motion vectors (|MVx|, |MVy|) are measured and the measured result are represented as (X, Y). Then, at the step S11, counter contents $MVx(X)_{count}$ and $MVy(Y)_{count}$ are incremented by one, respectively.

At the aforementioned step S1, if it is judged as the switching timing, the selection ratios $R_B$, $R_P$ and $R_{Fi}$, and the motion vector histograms Sx(X) and Sy(Y) are calculated at the steps S12–S14, respectively.

The selection ratios $R_B$ and $R_P$ are calculated by the following formulas (step S12).

$$R_B = B_{count}/(B_{count}+P_{count}+I_{count}) \times 100$$

$$R_P = P_{count}/(B_{count}+P_{count}+I_{count}) \times 100$$

The selection ratio $R_{Fi}$ is calculated by the following formula (step S13).

$$R_{Fi} = Fi_{count}/(Fi_{count}+Fr_{count}) \times 100$$

The motion vector histograms Sx(X) and Sy(Y) are calculated by the following formulas (step S14).

$$Sx(X) = \sum_{i=0}^{X} MVx(i)_{count} / \sum_{i=0}^{X_{MAX}} MVx(i)_{count}$$

$$Sy(Y) = \sum_{j=0}^{Y} MVy(j)_{count} / \sum_{j=0}^{Y_{MAX}} MVj(j)_{count}$$

The processes at the steps S12–S14 shown in, FIG. 3 are followed by processes at the respective steps S15–S17 shown in FIG. 4. At each of the steps S15–S17, whether it is a reset timing defined by a reset signal periodically applied thereto from the frame clock generator part 18 is judged.

If it is judged as the reset timing at the step S15, the prediction mode is initialized to I/P/B modes (full selectable mode of I mode, P mode and B mode) as Init1 (step S20). If it is not the reset timing, whether $R_B < R_{Bth}$ is judged at the step S18. If $R_B \geq R_{Bth}$, as it is necessary to use B mode for improving the picture quality, the prediction mode is initialized to I/P/B modes at the step S20. If $R_B < R_{Bth}$, B mode is omitted from candidates of prediction modes to be selected.

Then, at the step S19, it is judged whether $R_P < R_{Pth}$. If $R_P < R_{Pth}$, only I mode is selected as the prediction mode (step S22). If $R_P \geq R_{Pth}$, I/P modes (selectable mode of I mode and P mode) are selected as the prediction modes (step S21). At the step S23, thus limited prediction mode(s) is outputted.

Thus, in this embodiment, if the selection ratio of this B mode is lower than the threshold value $R_{Bth}$ due to for example quick motion in the picture, I/P modes are selected instead of I/P/B modes so as to increase the processing speed. Furthermore, if the selection ratio of P mode is lower than the threshold value $R_{Pth}$, only I mode is used so as to increase the processing speed moreover.

If it is judged as a reset timing at the step S16, the picture structure modes are initialized to Fr structure (Fi/Fr modes) as Init2 (step S25). If it is not the reset timing, whether $R_{Fi} > R_{Fith}$ is judged at the step S24. If $R_{Fi} \leq R_{Fith}$, as it is necessary to use Fr mode for improving the picture quality, the picture structure mode is initialized to Fr structure (Fi/Fr modes) at the step S25. If $R_{Fi} > R_{Fith}$, Fr mode is omitted from a candidate of picture structure modes to be selected and thus only Fi mode is selected (step S26). At the step S27, thus limited picture structure mode(s) is outputted.

Thus, if the selection ratio of Fi mode is higher than the threshold value $R_{Fith}$, the picture structure mode is limited to Fi mode.

If it is judged as a reset timing at the step S17, the motion vector search range is initialized to the maximum range as $MV_{rangex}=X_{MAX}$, $MV_{rangey}=Y_{MAX}$ (step S36). If it is not the reset timing, the motion vector histograms Sx(X) and Sy(Y) are compared with the threshold value $MV_{th}$ at the steps S28 and S31, respectively, as follows. Namely, at the step S28, it is judged whether $MV_{th}>Sx(i)$ and $Sx(i+1)\geq MV_{th}$ or not. At the step S31, it is judged whether $MV_{th}>Sy(j)$ and $Sy(j+1)\geq MV_{th}$ or not.

If it is not $MV_{th}>Sx(i)$ and $Sx(i+1)\geq MV_{th}$, the variable i is incremented by one and this comparison at the step S28 is repeated until the variable i reaches to the maximum value $X_{MAX}$ (steps S29 and S30). If the variable i reaches to $X_{MAX}$, the search range is initialized as $MV_{rangex}=X_{MAX}$ and $MV_{rangey}=Y_{MAX}$ at the step S36. If it is $MV_{th}>Sx(i)$ and $Sx(i+1)\geq MV_{th}$ (step S28), X-coordinate component of the search range is limited to $MV_{rangex}=i+1$ at the step S34.

Similar to this, if it is not $MV_{th}>Sy(j)$ and $Sy(j+1)\geq MV_{th}$, the variable J is incremented by one and this comparison at the step S31 is repeated until the variable j reaches to the maximum value $Y_{MAX}$ (steps S32 and S33). If the variable j reaches to $Y_{MAX}$, the search range is initialized as $MV_{rangex}=X_{MAX}$ and $MV_{rangey}=Y_{MAX}$ at the step S36. If it is $MV_{th}>Sy(j)$ and $Sy(J+1)\geq MV_{th}$ (step S31), Y-coordinate component of the search range is limited to $MV_{rangey}=j+1$ at the step S35. Then, at the step S37, thus limited search range of the motion vectors is outputted. As a result, the motion vector search range is limited to a range in which motion vectors of a certain ratio defined by the threshold value $MV_{th}$ is contained.

As will be apparent from the above-description, according to this embodiment, since the picture coding processes are effectively limited and simplified dynamically referring to the coding status, fast coding processing can be expected with maintaining coded picture quality.

Figure 5A:
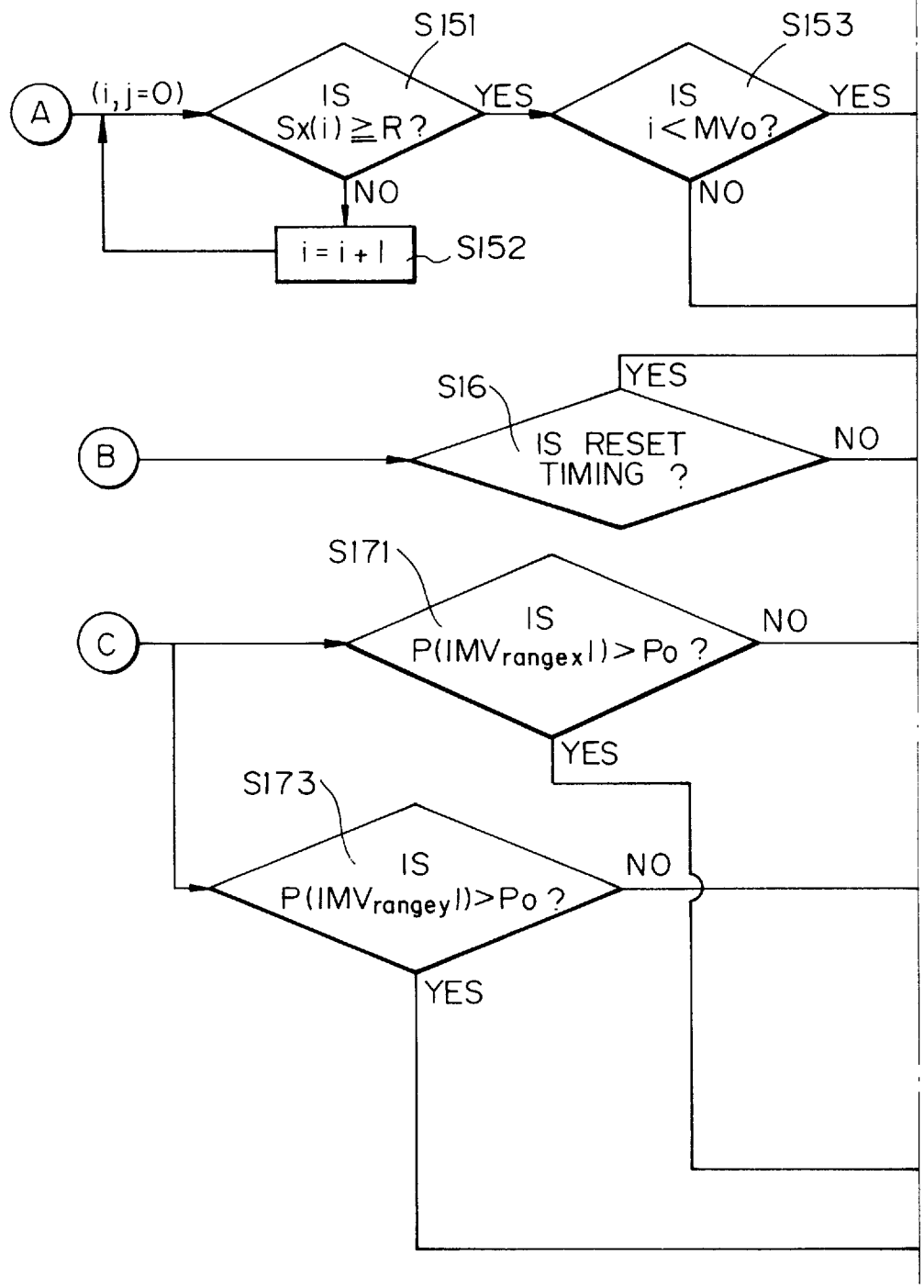
FIG. 5 combined by FIGS. 5A, 5B and 5C shows a part of a flow chart illustrating the operation of an additional circuit unit in an another embodiment of a motion picture coding apparatus according to the present invention.
Figure 5B:
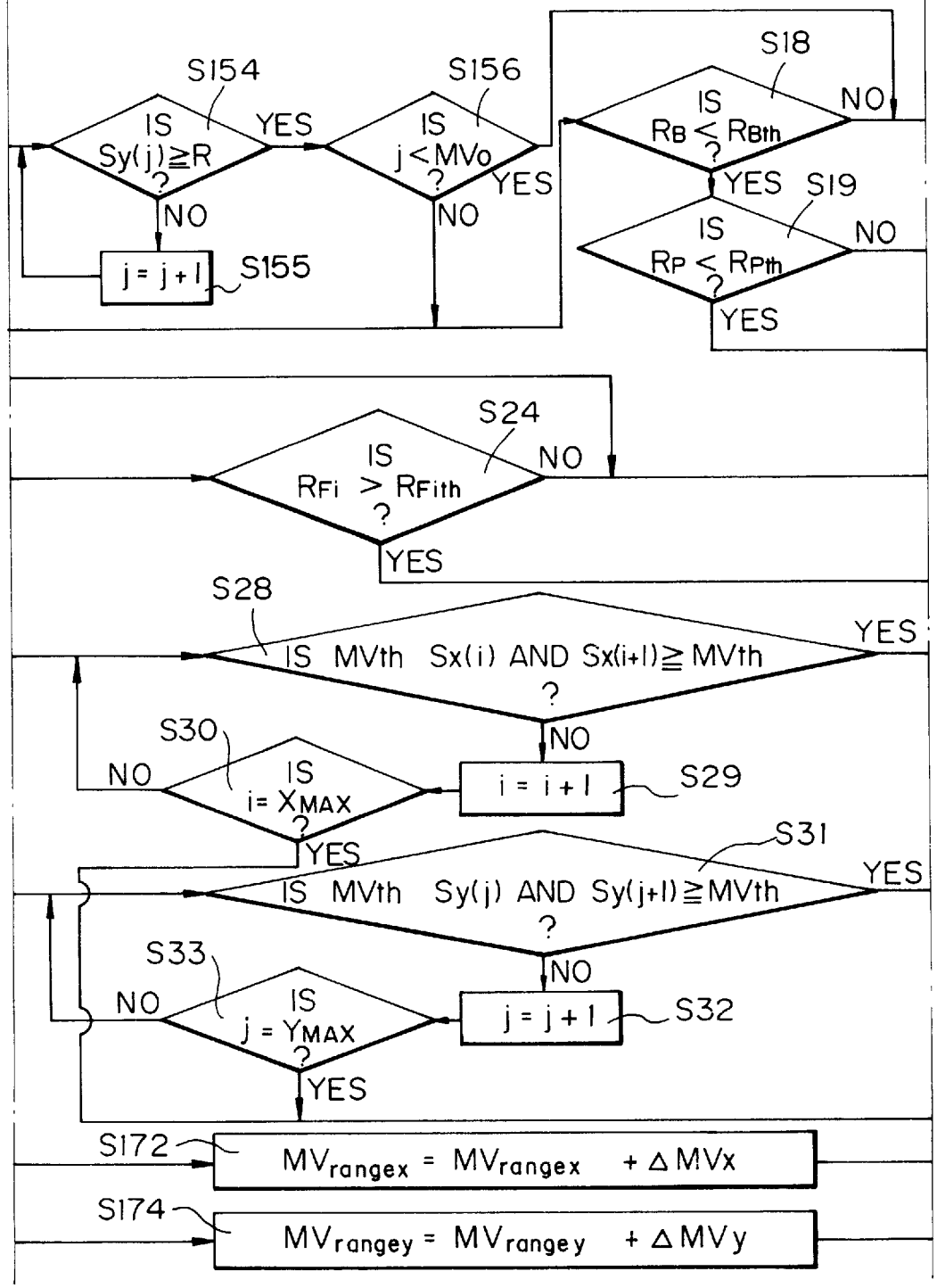
Figure 5C:
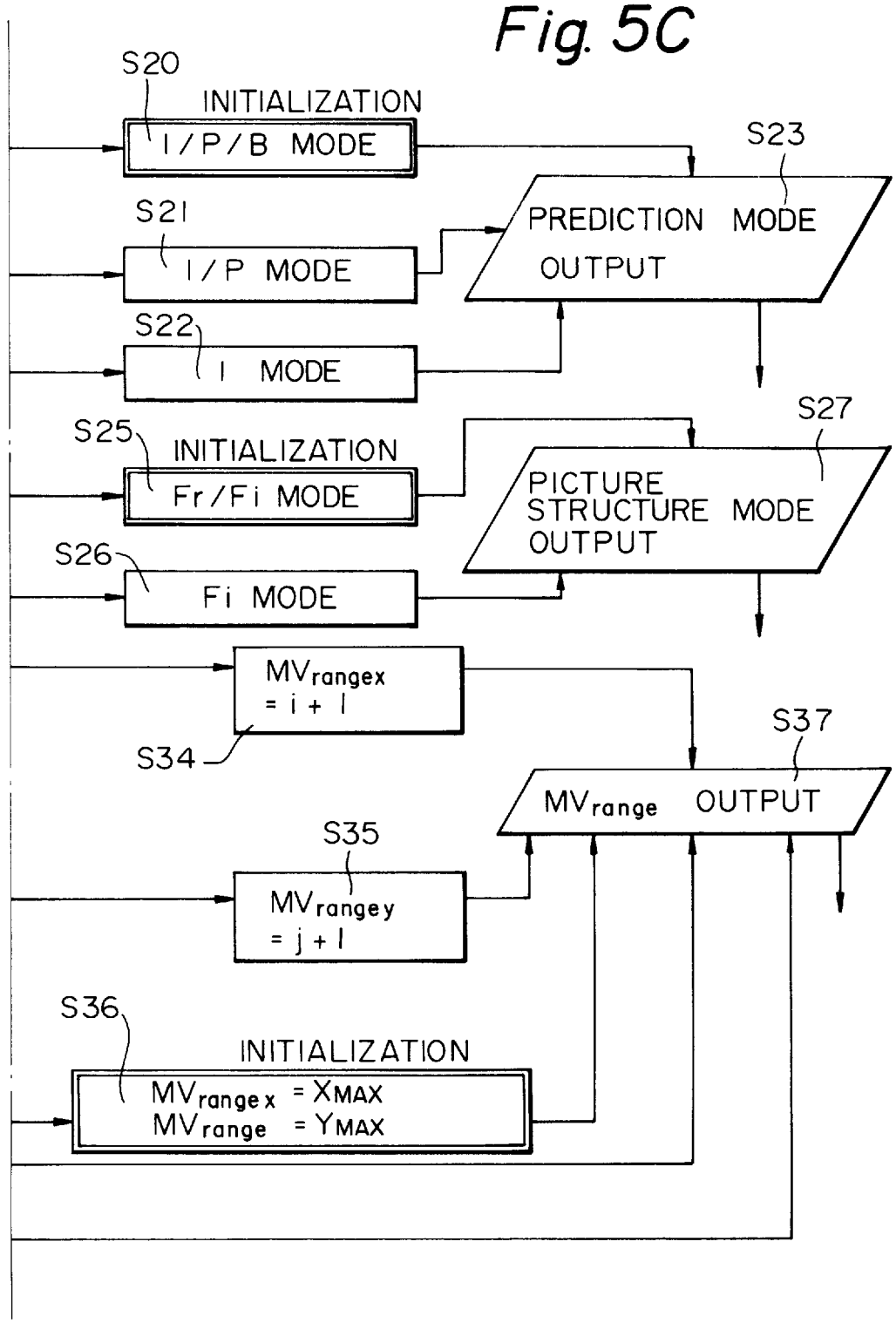

FIG. 5 which is combined by FIGS. 5A, 5B and 5C shows a part of a flow chart illustrating the operation of an additional circuit unit in an another embodiment of a coding apparatus for encoding motion picture according to the present invention.

In this embodiment, the same processes at the steps S1–S14 shown in FIG. 3 are performed. Then, the processes at the steps S12–S14 are followed by processes at the respective steps S151, S16, S171 and S173 shown in FIG. 5.

At the step 151, it is judged whether the motion vector histogram Sx(i) calculated at the step S14 is equal to or more than a predetermined inclusion ratio R. If Sx(i)<R, a variable i is incremented by one (step S152) and the process at the step S151 is repeated. As indicated in the figure, this variable i is reset to zero when the process proceeds from the step S14 to the step S151.

If $Sx(i)\geq R$, it is judged whether the variable i is less than a threshold value $MV_O$ or not at the step S153. If $i \geq MV_O$, it is not judged as a reset timing and the process proceeds to the step S18. If $i<MV_O$, the process proceeds to the step S154.

At the step S154, it is judged whether the motion vector histogram Sy(j) calculated at the step S14 is equal to or more than a predetermined inclusion ratio R. If Sy(j)<R, the variable j is incremented by one (step S155) and the process at the step S154 is repeated. This variable J is also reset to zero when the process proceeds from the step S14 to the step S151.

If $Sy(J)\geq R$, it is judged whether the variable j is less than a threshold value $MV_O$ or not at the step S156. If $j \geq MV_O$, it is not judged as the reset timing and the process proceeds to the step S18. If $j<MV_O$, it is judged as the reset timing and the process proceeds to the step S20. At the step S20, the prediction mode is initialized to I/P/B modes (full selectable mode of I mode, P mode and B mode) as Init1.

By performing the processes at the steps S151–S156 in this embodiment, the prediction mode to be selected is initialized to I/P/B modes (full search mode, B picture type) when the magnitudes (X-coordinate and Y-coordinate components) of the motion vectors corresponding to the predetermined inclusion ratio R in the histograms is less than a threshold value. In general, if the magnitude of the motion vector is large, the picture property will greatly change and thus there will be a little effect of using B mode. Contrary to this, if the magnitude of the motion vector is small, there will be great advantages to use B mode as the prediction mode. Thus, in the latter case only, the prediction mode is reset to full search mode, namely I/P/B modes. As a result, a lowering of the coding processing speed due to unnecessary reset operations can be prevented from occurring.

If it is not the reset timing, whether $R_B<R_{Bth}$ is judged at the step S18. If $R_B\geq R_{Bth}$, as it is necessary to use B mode for improving the picture quality, the prediction mode is initialized to I/P/B modes at the step S20. If $R_B<R_{Bth}$, B mode is omitted from candidates of prediction modes to be selected.

Then, at the step S19, it is judged whether $R_P<R_{Pth}$. If $R_P<R_{Pth}$, only I mode is selected as the prediction mode (step S22). If $R_P\geq R_{Pth}$, I/P modes (selectable mode of I mode and P mode) are selected as the prediction modes (step S21). At the step S23, thus limited prediction mode(s) is outputted.

Thus, in this embodiment, If the selection ratio of this B mode is lower than the threshold value $R_{Bth}$ due to for example quick motion in the picture, I/P modes are selected instead of I/P/B modes so as to increase the processing speed. Furthermore, if the selection ratio of P mode is lower than the threshold value $R_{Pth}$, only I mode is used so as to increase the processing speed moreover.

At the step S16, whether it is a reset timing defined by a reset signal periodically applied thereto from the frame clock generator part 18 is judged. If it is a reset timing, the picture structure modes are initialized to Fr structure (Fi/Fr modes) as Init2 (step S25). If it is not the reset timing, whether $R_{Fi}>R_{Fith}$ is judged at the step S24. If $R_{Fi}\geq R_{Fith}$, as it is necessary to use Fr mode for improving the picture quality, the picture structure mode is initialized to Fr structure (Fi/Fr modes) at the step S25. If $R_{Fi}>R_{Fith}$, Fr mode is omitted from a candidate of picture structure modes to be selected and thus only Fi mode is selected (step S26). At the step S27, thus limited picture structure mode(s) is outputted.

Thus, if the selection ratio of Fi mode is higher than the threshold value $R_{Fith}$, the picture structure mode is limited to Fi mode.

At the step S171, it is judged whether an occurrence rate $P(|MV_{rangex}|)$ of a state where the magnitude of X-coordinate component of the motion vectors search range $MV_{rangex}$ becomes equal to the maximum value of the motion vector search range $MV_{rangex}$ is more than a threshold value $P_O$ or not. If $P(|MV_{rangex}|)\leq P_O$, it is not judged as a reset timing and the process proceeds to the step S28. If $P(|MV_{rangex}|)>P_O$, X-coordinate component of the motion vector search range $MV_{rangex}$ is increased by a predetermined amount $\Delta MVx$ at the step S172. Then, at the step S37, this increased X-coordinate component of the motion vector search range $MV_{rangex}$ is outputted.

At the step S173, it is judged whether an occurrence rate $P(|MV_{rangey}|)$ of a state where the magnitude of Y-coordinate component of the motion vectors becomes equal to the maximum value of the motion vector search range $MV_{rangey}$ is more than a threshold value $P_0$ or not. If $P(|MV_{rangey}|) \leq P_0$, it is not judged as the reset timing and the process proceeds to the step S31. If $P(|MV_{rangey}|) > P_0$, Y-coordinate component of the motion vector search range $MV_{rangey}$ is increased by a predetermined amount $\Delta MVy$ at the step S174. Then, at the step S37, this increased Y-coordinate component of the motion vector search range $MV_{rangey}$ is outputted.

By performing the processes at the steps S171–S174 in this embodiment, the motion vector search range $MV_{rangex}$ and $MV_{rangey}$ are increased by the amount $\Delta MVx$ and $\Delta MVy$, respectively, when the magnitudes of the motion vectors of respective rates $P(|MV_{rangex}|)$ and $P(|MV_{rangey}|)$ become equal to the respective maximum values of the motion vector search ranges $MV_{rangex}$ and $MV_{rangey}$ and these rates $P(|MV_{rangex}|)$ and $P(|MV_{rangey}|)$ are more than the threshold value $P_{07415}$. If the motion vector search range is not sufficiently large with respect to possible quick motion in the picture, a motion vector with a large magnitude will be probably selected. Therefore, only in such case, the motion vector search range is reset to spread the range by the predetermined amount. As a result, a lowering of the coding processing speed due to unnecessary reset operations can be prevented from occurring.

If it is not the reset timing, the motion vector histograms $Sx(X)$ and $Sy(Y)$ are compared with the threshold value $MV_{th}$ at the steps S28 and S31, respectively, as follows. Namely, at the step S28, it is judged whether $MV_{th} > Sx(i)$ and $Sx(i+1) \geq MV_{th}$ or not. At the step S31, it is judged whether $MV_{th} > Sy(j)$ and $Sy(J+1) \geq MV_{th}$ or not.

If it is not $MV_{th} > Sx(i)$ and $Sx(i+1) \geq MV_{th}$, the variable i is incremented by one and this comparison at the step S28 is repeated until the variable i reaches to the maximum value $X_{MAX}$ (steps S29 and S30). If the variable i reaches to $X_{MAX}$, the search range is initialized as $MV_{rangex} = X_{MAX}$ and $MV_{rangey} = Y_{MAX}$ at the step S36. If it is $MV_{th} > Sx(i)$ and $Sx(i+1) \geq MV_{th}$ (step S28), X-coordinate component of the search range is limited to $MV_{rangex} = i+1$ at the step S34.

Similar to this, if it is not $MV_{th} > Sy(j)$ and $Sy(J+1) \geq MV_{th}$, the variable j is incremented by one and this comparison at the step S31 is repeated until the variable j reaches to the maximum value $Y_{MAX}$ (steps S32 and S33). If the variable j reaches to $Y_{MAX}$, the search range is initialized as $MV_{rangex} = X_{MAX}$ and $MV_{rangey} = Y_{MAX}$ at the step S36. If it is $MV_{th} > Sy(j)$ and $Sy(j+1) \geq MV_{th}$ (step S31), Y-coordinate component of the search range is limited to $MV_{rangey} = j+1$ at the step S35. Then, at the step S37, thus limited search range of the motion vectors is outputted. As a result, the motion vector search range is limited to a range in which motion vectors of a certain ratio defined by the threshold value $MV_{th}$ is contained.

As will be apparent from the above-description, according to this embodiment, since the picture coding processes are effectively limited and simplified dynamically referring to the coding status, fast coding processing can be expected with maintaining coded picture quality. In addition, a great extent deterioration of picture quality due to over limitation and a lowering of the coding processing speed due to unnecessary reset operations can be effectively prevented from occurring.

Another constitution and operation of this embodiment are the same as these of the previously mentioned embodiment with respect to FIGS. 1 to 3.

In the aforementioned embodiments, all of the prediction mode, the picture structure mode and the motion vector search range are limited. According to the present invention, however, one or two of the prediction mode, the picture structure mode and the motion vector search range may be limited.

Furthermore, in the embodiments, if the selection ratio of B mode is low, the prediction mode is limited to I/P modes or I mode. However, according to the present invention, if the selection ratio of B mode is low, the prediction mode may be limited to I/P modes only.

Many widely different embodiments of the present invention may be constructed without departing from the spirit and scope of the present invention. It should be understood that the present invention is not limited to the specific embodiments described in the specification, except as defined in the appended claims.

What is claimed is:

1. A motion picture coding apparatus for searching a plurality of proposed coding modes and/or parameters, for selecting a suitable coding mode and/or a suitable parameter, and for encoding motion pictures using the selected coding mode and/or parameter, said apparatus comprising:

a measuring means for measuring histograms of magnitudes of motion vectors during coding processes to provide measured histograms; and a limiting means for adaptively limiting a size of a search range of motion vectors depending upon the measured histograms.

2. The apparatus as claimed in claim 1, wherein said means for limiting search range of motion vectors includes means for detecting from the measured histograms a range in which motion vectors of a certain ratio defined by a threshold value is contained so as to determine the size of the search range of motion vectors to the detected range.

3. The apparatus as claimed in claim 1, wherein said apparatus further comprises a reset means for periodically resetting the search range of motion vectors to an initial range.

4. The apparatus as claimed in claim 1, wherein said apparatus further comprises a reset means for adaptively resetting the search range of motion vectors depending upon the measured histograms.

5. The apparatus as claimed in claim 4, wherein said reset means includes means for increasing the search range of motion vectors when an occurrence rate of a state where magnitudes of the motion vectors become equal to the maximum value of said search range of motion vectors depending upon the measured histograms is more than a threshold value.

6. The apparatus as claimed in claim 1, wherein said measuring means includes means for measuring a selection ratio of a picture structure mode during coding processes to provide a measured selection ratio, and wherein said limiting means includes means for limiting structure modes to be searched depending upon the measured selection ratio.

7. The apparatus as claimed in claim 6, wherein said measuring means includes means for measuring a selection ratio of field mode during coding processes to provide measured selection ratio of field mode, and wherein said limiting means includes means for limiting picture structure mode to be searched to field mode when the measured selection ratio of field mode is more than a predetermined threshold value.

8. The apparatus as claimed in claim 6, wherein said apparatus further comprises a reset means for periodically resetting the picture structure mode to frame mode.

9. A motion coding apparatus for searching a plurality of proposed coding modes and/or parameters, for selecting a suitable coding mode and/or a suitable parameter, and for encoding motion pictures using the selected coding mode and/or parameter, said apparatus comprising:

a measuring means for measuring a selection ratio of at least one prediction mode during coding processes to provide a measured selection ratio; and a limiting means for adaptively limiting candidates of prediction modes to be searched depending upon the measured selection ratio.

10. The apparatus as claimed in claim 9, wherein said measuring means includes means for measuring a selection ratio of B mode during coding processes to provide measured selection ratio of B mode, and wherein said limiting means includes means for limiting candidates of prediction modes to be searched to I/P modes when the measured selection ratio of B mode is less than a predetermined threshold value.

11. The apparatus as claimed in claim 9, wherein said measuring means includes means for measuring selection ratios of B mode and P mode during coding processes to provide measured selection ratios of B mode and of P mode, and wherein said limiting means includes means for limiting candidates of prediction modes to be searched to I/P modes when the measured selection ratio of B mode is less than a first predetermined threshold value and also the measured selection ratio of P mode is equal to or more than a second predetermined threshold value, and for limiting candidates of prediction modes to be searched to I mode when the measured selection ratio of B mode is less than the first predetermined threshold value and also the measured selection ratio of P mode is less than the second predetermined threshold value.

12. The apparatus as claimed in claim 9, wherein said apparatus further comprises a reset means for periodically resetting the prediction modes to be searched to initial modes.

13. The apparatus as claimed in claim 9, wherein said apparatus further comprises a reset means for adaptively resetting the prediction modes to be searched depending upon histograms of magnitudes of motion vectors, measured during coding processes.

14. The apparatus as claimed in claim 13, wherein said reset means includes means for resetting the prediction modes to be searched to initial modes when magnitudes of the motion vectors corresponding to a predetermined inclusion ratio in the measured histograms is less than a threshold value.

15. The apparatus as claimed in claim 9, wherein said measuring means includes means for measuring the selection ratio of a picture structure mode during coding processes to provide a measured selection ratio, and wherein said limiting means includes means for limiting structure modes to be searched depending upon the measured selection ratio.

16. The apparatus as claimed in claim 15, wherein said measuring means includes means for measuring the selection ratio of a field mode during coding processes to provide a measured selection ratio of the field mode, and wherein said limiting means includes means for limiting picture structure mode to be searched to the field mode when the measured selection ratio of the field mode is more than a predetermined threshold value.

* * * * *